April 5, 1938.  G. W. PIERCE  2,112,863
ELECTRICAL SYSTEM
Original Filed Jan. 5, 1923
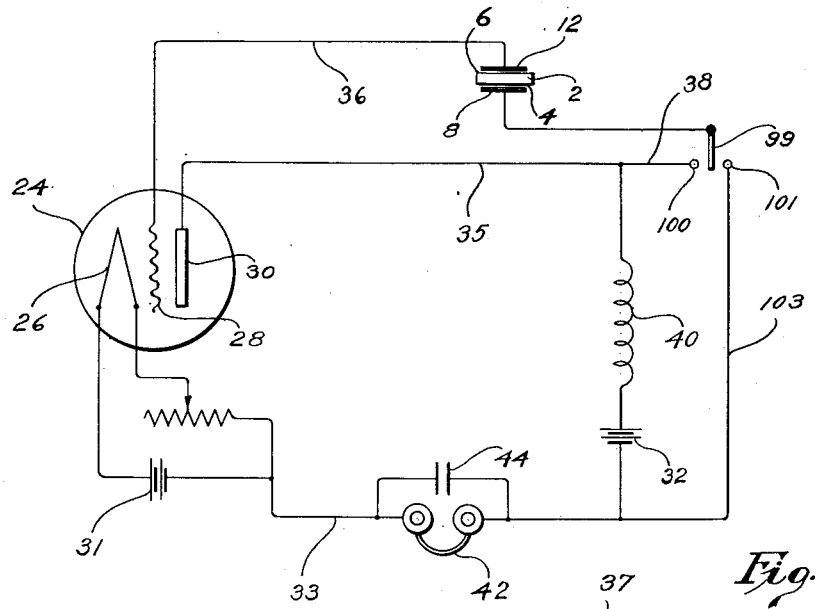
Fig. 1
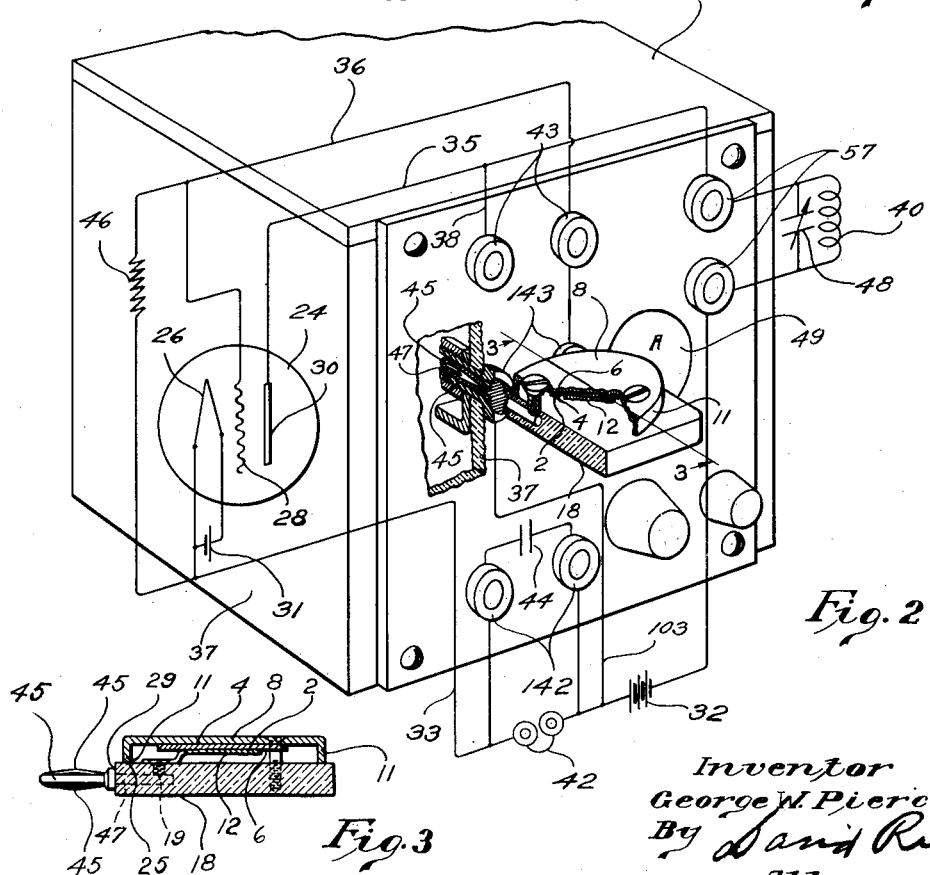
Fig. 2
Fig. 3
Inventor
George W. Pierce
By David Rines
Attorney Patented Apr. 5, 1938

2,112,863

UNITED STATES PATENT OFFICE 2,112,863

ELECTRICAL SYSTEM

George W. Pierce, Cambridge, Mass.

Application January 5, 1928, Serial No. 244,634
Renewed February 27, 1935

20 Claims. (Cl. 250—36)

The present invention relates to electrical systems, and more particularly to methods of and apparatus for producing and sustaining the oscillations of electrical systems employing electromechanical vibrators, like piezo-electric crystals.

Such vibrators, as is now well known, execute mechanical vibrations under vibratory electrical stimulus and, conversely, develop electrical potentials as a result of their mechanical vibrations. They have, in general, a plurality of particular modes or periods of mechanical vibration, of different frequency. These mechanical and electrical effects, as is explained in a copending application, Serial No. 695,094, filed February 25, 1924, of which the present application is a continuation in part, may be rendered oscillatory in character, and persistent.

For convenience, the action of the electric forces to cause mechanical deformation will be termed "stimulation"; and the development of electromotive force by the deformation will be termed "response".

An object of the present invention is to provide for changing, at will, from one mode of vibration to another. Other and further objects will be explained hereinafter, and will be pointed out in the appended claims, it being understood that it is intended to cover in the appended claims all the novelty that the invention may possess.

In the accompanying drawing, Fig. 1 is a diagrammatic view of circuits and apparatus illustrating an embodiment of the invention; Fig. 2 is a similar view of a modification, parts being shown broken away; and Fig. 3 is a longitudinal section of a portion of the apparatus shown in Fig. 2.

The preferred form of electro-mechanical vibrator is illustrated as a piezo-electric crystal plate 2, adjacent to the oppositely disposed sides or surfaces 4 and 6 of which are provided opposed conducting electrodes, terminals or plates 8 and 12, by means of which the vibrator is adapted to be connected in an electric circuit.

For illustrative purposes, a vacuum tube 24 is diagrammatically shown provided with three sensitive elements or electrodes, namely, a filament 26, a grid 28 and a plate 30. The filament 26 is connected with a filament-heating battery 31. A plate battery 32 is connected with the filament 26 by a conductor 33, and with the plate 30 by a conductor 35. A load 40, shown in the form of an inductance coil, is connected between the battery 32 and the conductor 35. The coil 40, which acts as an admittance, may be replaced by a resistor or any other proper type of electrical apparatus in which the oscillatory power is utilized. If a resistor 40 is employed, its distributive capacity and the capacity between the electrodes of the tube supply the parameters having the requisite values for determining the oscillating condition, as will be understood from the description to follow. A grid-leak resistor 46 may also be employed, as shown in Fig. 2. A tuning condenser 48 may, if desired, be connected in parallel with the load, as is also shown in Fig. 2, or the power of the system may, for some purposes, be increased by electrical tuning of some other element into resonance with the frequency of mechanical vibration of the vibrator. Such tuning makes it possible to exclude undesired frequencies. A telephone receiver 42, with or without a bypass condenser 44, may be inserted in the conductor 33.

As so far described, the system is not oscillatory. If now, one of the electrodes 12 of the electro-mechanical vibrator be connected by a conductor 36 with the grid, and the other electrode 8 by a conductor 38 to some point in the circuit of the plate 30, the system will oscillate with sustained oscillations, and the vibrator will vibrate mechanically at a frequency determined, to a high degree of precision, by the frequency of one of the modes of mechanical vibration of the vibrator. The oscillating frequency is dependent merely on the physical dimensions and properties of the crystal 2, is independent of the electrical parameters of the circuits, and is essentially unmodifiable, even by large changes of these parameters, except in cases where certain controllable changes, as hereinafter stated, may result in shifting the frequency from that of one mode to that of another distinct mode; for, as is described in the aforesaid application, the mode of vibration depends somewhat on the point of connection to the plate circuit, and is independent of the value or the nature of the load 40.

This connection of the electro-mechanical vibrator between the grid and the plate of the vacuum tube is illustrated in Fig. 5, page 275, of my paper on Piezoelectric crystal oscillators applied to the precision measurement of the velocity of sound in air and $CO_2$ at high frequencies, in the Proceedings of the American Academy of Arts and Sciences for October, 1925, vol. 60, No. 5. As is illustrated in Fig. 6, page 276 of the same paper, however, the vibrator may be inserted in the grid circuit, between the filament and the grid; or in the plate circuit, between the filament and the plate, as is explained in the aforesaid application.

In accordance with the present invention, the mode of vibration of the electro-mechanical vibrator may be changed. I have found that with an electro-mechanical system of the illustrated type, with one electrode 12 connected with the grid and the other electrode 8 connected with the plate, as just described, the plate having in series with it an inductance of, say, 10 millihenries, the vibrator oscillates with a stable, highly constant, frequency determined by the period of the vibrator along its electrical axis, the crystal vibrating in the direction of its thickness. This is known as the longitudinal effect and occurs when the switch arm 99 of Fig. 1 is in contact with the switch point 100. If, now, the switch arm 99 is shifted to the switch point 101, the same vibrator, being now connected by a conductor 103 and conductor 33, through the capacity 44, with the filament 26, oscillates with a new stable frequency determined by a dimension at right angles to the said electrical axis. This is known as the transverse effect. Since this dimension at right angles to the electrical axis is, in general, different from the dimension along the said axis, the shift of the switch changes the oscillations from one stable frequency to another stable frequency. It is thus possible, in general, to obtain different frequencies, depending upon whether the crystal is connected between the filament and the grid or between the grid and a point in the plate circuit. The longitudinal and the transverse are two fundamental modes of vibration of the crystal vibrator. When the vibrator vibrates according to its longitudinal mode of vibration, the components of vibration in other directions than the longitudinal are negligible by comparison. When the vibrator vibrates according to its transverse mode of vibration, similarly, the component of vibration in the transverse direction is very greatly predominant. The vibrator has also other modes of vibration than the fundamental modes, and these may, for definiteness, be referred to as subsidiary modes of vibration. All these different modes of vibration each correspond to a different frequency. Such other frequencies are also obtainable, especially those determined by the harmonics, which, if desired, may be selected and individually amplified by amplifier connections to additional vacuum tubes.

The prime reason for the different frequency vibrations will be made apparent when it is remembered that the frequency of the oscillations of an oscillating circuit depends upon the electrical parameters of the circuit. The crystal has capacitance, inductance and resistance of variable character, and these vary so as to have different effective values in accordance with the connections of the crystal between the electrodes of the vacuum tube. When the crystal is disposed between the grid and the filament, it cooperates with the high-impedance choke of the telephone 42 and the capacitance of the bypass condenser 44 in such fashion that the resultant electrical parameters are of such values as to produce oscillations determined by one mode of vibration of the crystal. When the crystal is connected between the grid and the plate, on the other hand, the resultant electrical parameters will be of such value that the oscillations will be determined by another mode of crystal vibration. The crystal seems to provide within itself, furthermore, particularly at the points of resonance, a capability of varying the original electrical parameters of the system within very wide limits. The resultant electrical parameters of the system with crystal included may, therefore, be materially different from what they would be with the crystal excluded from the system. It results that, if the electrical parameters of the system, with the crystal excluded, are not such as to determine a frequency corresponding to one of the modes of vibration of the crystal, the oscillations may not take place at all; but if they do take place, it will be at the frequency of that particular mode of vibration of the crystal. If the parameters of the system are too far away to permit oscillations at such frequency, obviously, the system can not oscillate; but the crystal will pull the oscillations into its own period if the parameters are not altogether too far away from the necessary values. The condenser 48 or other tuning arrangements will permit adjustment of the circuit parameters, and the parameters may be varied also by using other coils 40 or other electrical apparatus. In all cases, the system will oscillate,—if it oscillates at all,—at the frequency determined by some mode of vibration of the crystal, substantially irrespective of the frequency determined by the parameters of the tuned circuit, and even though these parameters differ from the vibrating-determining parameters over an exceedingly wide range. Once the system is oscillating, for example, the condenser 48 may be varied within wide limits without substantially changing the frequency; and when the condenser adjustment is so far away as to prevent oscillations at the particular frequency, the system will either stop oscillating altogether or else fall into step, under suitable conditions, with the frequency determined by another mode of vibration of the crystal. The condenser 48 is particularly of value when it is desired to adjust the parameters of the system for oscillating at frequencies determined by different crystals.

It is thus possible to obtain different frequencies first: by using the same coil 40 or other apparatus, and different crystals; secondly, by using different coils 40 or other apparatus, and the same crystal; thirdly, by varying both the crystal and the other electrical apparatus; and finally, by connecting the crystal into the system in different ways, as before described. It will now be shown how these results may be attained in a convenient, practical way, reference being had to the modification shown in Figs. 2 and 3.

The crystal vibrator 2 is contained within a holder 11, the flat metal top of which constitutes the electrode 8. The other electrode 12, shown in the form of a lightly pressing metal spring member, is disposed in the holder 11 between the vibrator 2 and an insulating cover 18. The holder 11 is provided with two plugs 47, one of which is electrically connected with the metal-top electrode 8 and the other with the metal-spring electrode 12, the latter through a screw 19. The plugs 47 are thus electrically connected to the opposite sides 4 and 6 of the crystal vibrator 2.

The plugs 47 are adapted to be received either in a pair of high-frequency sockets 43 or a pair of low-frequency sockets 143 provided in the side of a box mounting or cabinet 37. The sockets 43 and 143 are constituted of metal contact members that are connected in electric circuits, as presently to be described. The electrical connections are such that the vibrator will vibrate mechanically in one of its modes of vibration when the plugs 47 are received in the pair of sockets 43, and in another mode when the plugs 47 are received in the other pair of sockets 143. The plugs 47 are readily detachable from either pair of sockets and as readily reinsertable in the other pair of sockets. Not one crystal holder 11 alone, but any number of such holders may be employed, each with a different crystal. The described construction provides, therefore, for changing rapidly from one crystal to another of different frequency characteristics, and also for changing from one mode of vibration of each crystal to another mode of vibration of the same crystal.

In order that the crystal holder 11 may be held resiliently, in the sockets 43 and 143, the plugs 47 are provided with longitudinally extending spring fingers 45. These fingers 45 press outward against the inner walls of the sockets 43 and 143 to hold the crystal holder 11 firmly in place, yet so that it can readily be detached from the mounting 37.

The vacuum tube 24 (or any number of such tubes) and other apparatus for partly or wholly making circuit connections are contained within the box 37. The circuit connections are illustrated diagrammatically in Fig. 2, the same reference numerals as in Fig. 1 being used, wherever possible, to denote like parts. Plug-receiving sockets 142 in the side of the mounting permit connecting the telephone receiver 42 into and out of circuit. Similar plugs or binding posts 57 serve a similar purpose for the coil 40, and also for the condenser 48, if one is employed. An ammeter 49 may also be connected in circuit to indicate when the system is oscillating, as described in application Serial No. 98,220, filed March 29, 1926, of which also the present application is a continuation in part, but the connections are omitted from the present drawing in order to simplify the disclosure.

One of each of the pairs of sockets 43 and 143 is connected by the conductor 36 with the grid 28. The grid 28 is thus electrically connected with the electrode 12. The other socket 43 is connected by the conductors 38 and 35 with the plate 30, establishing an electric connection from a point in the circuit of the plate 30 to the electrode 8. The other socket 143 is connected by the conductors 103 and 33 with the filament 26. The filament is thus electrically connected, through the condenser 44 and the telephone 42, with the electrode 8. When the plugs 47 are inserted in the sockets 43, therefore, the crystal vibrates in the same manner as before described when the switch arm 99 of Fig. 1 contacts with the switch point 100, the crystal being connected between the grid and a point in the plate circuit. When the plugs 47 are inserted in the sockets 143, the connections correspond to those obtaining when the switch 99 contacts with the switch point 101, the crystal being connected through the condenser 44 and the telephones 42, between the grid and the filament. By plugging into one pair of sockets 43 or the other pair of sockets 143, therefore, the crystal may be caused to vibrate according to one or another mode of vibration.

It will, of course, be understood that the invention is not restricted to the exact embodiments thereof that are illustrated and described herein, as modifications may be made by persons skilled in the art, and all such are considered to fall within the spirit and scope of the invention, as defined in the appended claims.

What is claimed is:

1. An electromechanical oscillatory system having, in combination, electric apparatus, a piezo-electric crystal, means connecting the apparatus and the crystal together into an electric system having parameters such as to cause the system to oscillate and the crystal to vibrate with a stable frequency determined by a mode of vibration of the piezo-electric-crystal, and means for changing the parameters of the system to change the said mode of vibration and stable frequency to a new mode of vibration and a new stable frequency.

2. An oscillatory system having, in combination, an electric system, an electromechanical vibrator for controlling the frequency of the oscillations of the system and having electrodes, means for connecting one of the electrodes to a fixed point of the system, and means for selectively connecting another electrode to different points of the system to selectively connect the vibrator in different portions of the electric system and for varying the electrical parameters of the system to cause the system to oscillate at selectively different frequencies.

3. An oscillatory system having, in combination, an electric system, an electromechanical vibrator controlling the frequency of the oscillations of the system, and means comprising a switch member for selectively connecting the vibrator in different portions of the electric system and for varying the electrical parameters of the system to cause the system to oscillate at selectively different frequencies.

4. An oscillatory system having, in combination, electric apparatus, an electromechanical vibrator capable of vibrating through the action of reversible internal stresses along two directions perpendicular to each other, and means for electrically connecting the apparatus and the vibrator together into an electric system and for selectively varying the electrical parameters of the system to cause the vibrator to vibrate in either of the said two directions and the system to oscillate selectively with a frequency determined by the vibrations of the vibrator in either of the said two directions.

5. An oscillatory system having, in combination, a space-current device having more than two electrodes, an electromechanical vibrator for controlling the frequency of the oscillations of the system, and means for selectively connecting the vibrator between different pair of the electrodes to cause the system to oscillate at selectively different frequencies.

6. An oscillatory system having, in combination, an electric system, an electromechanical vibrator controlling the frequency of the oscillations of the system, and means for selectively connecting the vibrator in different portions of the electric system and for varying the electrical parameters of the system to cause the system to oscillate at selectively different frequencies.

7. An oscillatory system having, in combination, a space-current device having three electrodes, a mounting having two pair of contact members, one of the pair of contact members being respectively connected with two of the electrodes, the other pair of contact members being respectively connected with one of the said two electrodes and the third electrode, an electromechanical vibrator capable of vibrating mechanically according to a plurality of modes of vibration and having two contact members connected to opposite sides thereof, and means for selectively making contact between the two vibrator contact members and the contact members of either of the said two pair of contact members to cause the vibrator to vibrate and the system to oscillate selectively with a frequency determined by one or another of the said modes of vibration.

8. An oscillatory system having, in combination, a space-current device having three electrodes, an electromechanical vibrator capable of vibrating according to a plurality of modes of vibration, and means for connecting the vibrator between two of the electrodes to cause the vibrator to vibrate and the system to oscillate with a frequency determined by one of the said modes and for connecting the vibrator between one of the said two electrodes and the third electrode to cause the vibrator to vibrate and the system to oscillate with a frequency determined by another of the said modes.

9. An oscillatory system having, in combination, a space-current device having a filament, a grid and a plate, an electromechanical vibrator capable of vibrating according to a plurality of modes of vibration, and means for selectively connecting the vibrator between the filament and the grid and between the plate and the grid to cause the vibrator to vibrate and the system to oscillate selectively with a frequency determined by one or another of the said modes of vibration.

10. An oscillatory system having, in combination, a space-current device having a filament, a grid and a plate, an electromechanical vibrator capable of vibrating according to a plurality of modes of vibration, the vibrator being adapted to vibrate mechanically when stimulated electrically and to respond electrically when vibrated mechanically, and means for selectively connecting the vibrator between the filament and the grid and between the plate and the grid to cause the vibrator to vibrate and the system to oscillate selectively with a frequency determined by one or another of the said modes of vibration.

11. A method of oscillating an electric system by electromechanical means capable of vibrating mechanically according to a plurality of fundamental modes of vibration that comprises selectively electrically connecting the electromechanical means and the system together and varying the electrical parameters of the system to cause the electromechanical means to vibrate and the system to oscillate selectively with a frequency determined by one or another of the said fundamental modes of vibration.

12. A method of oscillating an electric system having an electromechanical vibrator that comprises selectively connecting the electromechanical vibrator in different portions of the electric system and varying the electrical parameters of the system to cause the system to oscillate at selectively different frequencies.

13. A method of oscillating an electric system having a space-current device provided with more than two electrodes and having an electromechanical vibrator that comprises selectively connecting the electromechanical vibrator between different pairs of the electrodes and varying the electrical parameters of the system to cause the system to oscillate at selectively different frequencies.

14. A method of oscillating an electric system having a space-current device provided with three electrodes and having an electromechanical vibrator that is capable of vibrating mechanically according to a plurality of modes of vibration, the said method comprising inserting the electromechanical vibrator selectively between two of the electrodes or between one of the said two electrodes and the third electrode and varying the electrical parameters of the system to cause the vibrator to vibrate and the system to oscillate selectively with a frequency determined by one of the said modes of vibration.

15. An oscillatory system having, in combination, electric apparatus, means capable of vibrating mechanically according to a plurality of fundamental modes of vibration, and means for electrically connecting the apparatus and the first-named means together into an electric system and for selectively varying the electrical parameters of the system to cause the first-named means to vibrate and the system to oscillate selectively with a frequency determined by one or another of the said fundamental modes of vibration.

16. An oscillatory system having, in combination, a space-current device, a mounting having a plurality of pairs of contact members connected in the circuit of the space-current device, a vibrator capable of vibrating mechanically according to a plurality of modes of vibration and having two contact members electrically connected with the vibrator, and means for selectively making electrical contact between the two vibrator contact members and the contact members of any of the said pairs of contact members and for varying the electrical parameters of the system to cause the vibrator to vibrate and the system to oscillate selectively with a frequency determined by another of the said modes.

17. An oscillatory system having, in combination, a space-current device having three electrodes, a vibrator capable of vibrating according to a plurality of modes of vibration, and means for connecting the vibrator between two of the electrodes to cause the vibrator to vibrate and the system to oscillate with a frequency determined by one of the said modes and for connecting the vibrator between one of the said two electrodes and the third electrode to cause the vibrator to vibrate and the system to oscillate with a frequency determined by another of the said modes.

18. An oscillatory system having, in combination, a space-current device having more than two electrodes, two pairs of contact members, one of the pairs of contact members being respectively connected with a pair of the electrodes, the other pair of contact members being respectively connected with another pair of the electrodes, an electromechanical vibrator capable of vibrating mechanically according to a plurality of modes of vibration, and means for selectively connecting the vibrator between the contact members of either of the said two pairs of contact members to cause the vibrator to vibrate and the system to oscillate selectively with a frequency determined by one or another of the said modes of vibration.

19. An oscillatory system having, in combination, a space-current device having more than two electrodes, a piezo-electric crystal for controlling the frequency of the oscillations of the system, and means for selectively connecting the crystal between different pair of the electrodes to cause the system to oscillate at selectively different frequencies.

20. In an electric system comprising a piezo-electric crystal capable of producing in the system oscillations of substantially constant, selected frequencies corresponding to a plurality of modes of vibration of the crystal, a space-current device having an input circuit and an output circuit, and means for selectively connecting the crystal with the circuits of the space-current device to vary selectively the effective impedances of the circuits of the space-current device to preselected values such as to cause the crystal to sustain oscillations in the system at the said selected frequencies.

GEORGE W. PIERCE.